(12) United States Patent
Moore

(10) Patent No.: US 6,347,319 B1
(45) Date of Patent: Feb. 12, 2002

(54) METHODS OF OBTAINING LISTINGS OF INFORMATION FROM DATABASES

(75) Inventor: Keith E. Moore, Santa Clara, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/326,072

(22) Filed: Jun. 4, 1999

(51) Int. Cl.[7] .......................... G06F 17/30; G06F 17/60
(52) U.S. Cl. ................ 707/101; 707/2; 707/3; 707/4; 707/5; 705/26; 705/30; 705/35; 705/36
(58) Field of Search .............. 707/101, 3, 2, 707/4, 5; 705/26, 30, 35, 36

(56) References Cited

U.S. PATENT DOCUMENTS

| | | | |
|---|---|---|---|
| 4,243,694 A | | 1/1981 | Mansukhani |
| 5,093,147 A | | 3/1992 | Andrus et al. |
| 5,115,326 A | * | 5/1992 | Burgess et al. ............. 358/440 |
| 5,424,524 A | * | 6/1995 | Ruppert et al. ............. 235/462 |
| 5,735,547 A | | 4/1998 | Morelle et al. |
| 5,853,197 A | | 12/1998 | Mowry, Jr. et al. |
| 5,995,976 A | * | 11/1999 | Walker et al. ............. 707/104 |

* cited by examiner

Primary Examiner—Frantz Coby

(57) ABSTRACT

In one aspect, the invention encompasses a method of obtaining a listing of information from a database and utilizing the listing as a user input to a machine in data communication with the database. A database is provided, and such database has a plurality of objects stored therein. A machine is utilized to form a machine-readable code on a substrate. The machine-readable code describes the location of a set of objects in the database. The machine-readable code is read with a reading machine configured to access the database and extract the set of objects from the database. The extracted set of objects is outputted as a listing on a substrate. The substrate having the listing thereon is provided to a user. The user marks at least some of the objects on the listing. After at least some of the objects are marked, the listing is scanned with a scanning machine configured to recognize the objects and to distinguish marked objects from unmarked objects. The scanning machine is in data communication with the database and is in data communication with a processor which performs a different operation on marked objects of the listing than on unmarked objects of the listing. Accordingly, the listing functions as a user input to the processor.

19 Claims, 3 Drawing Sheets

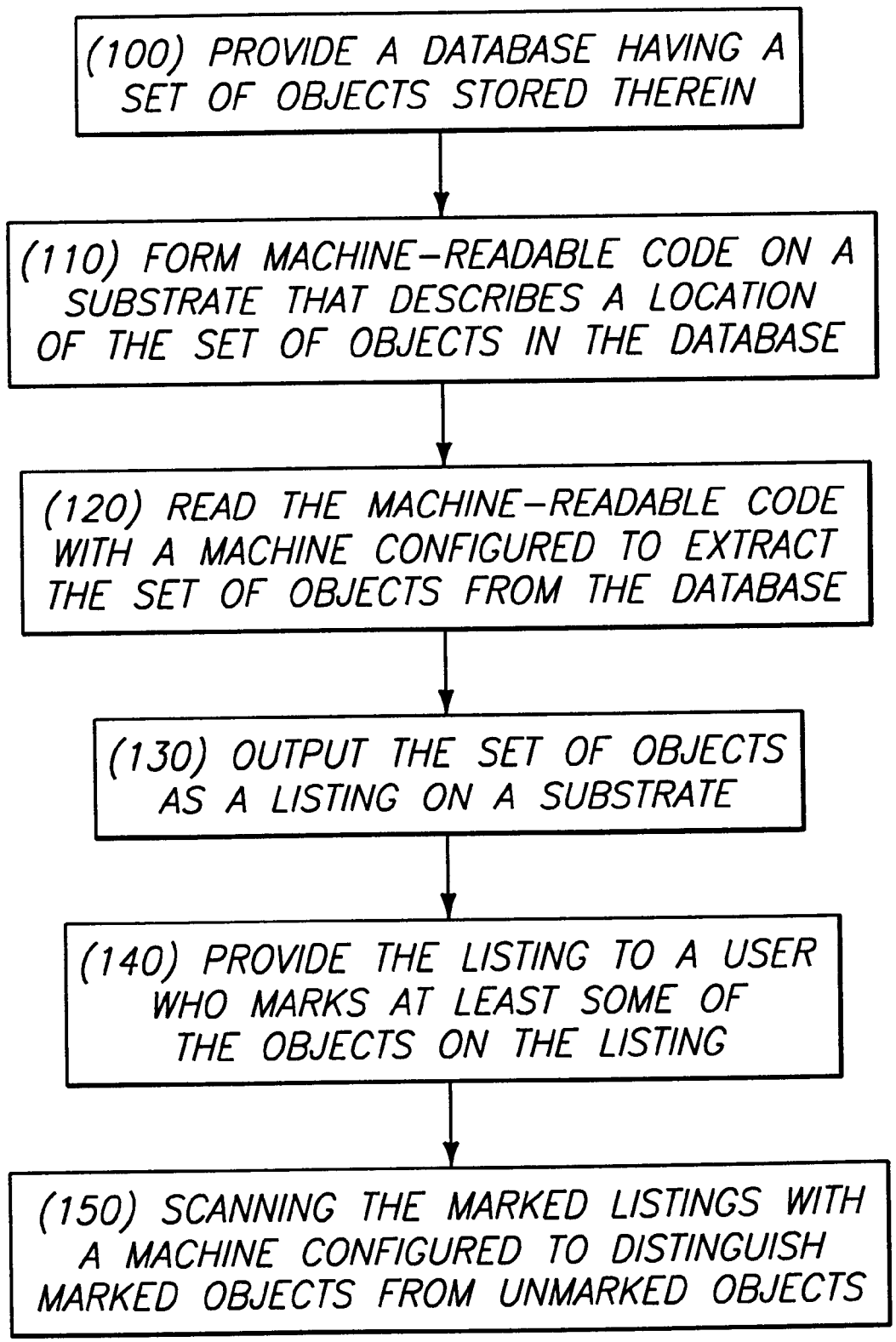

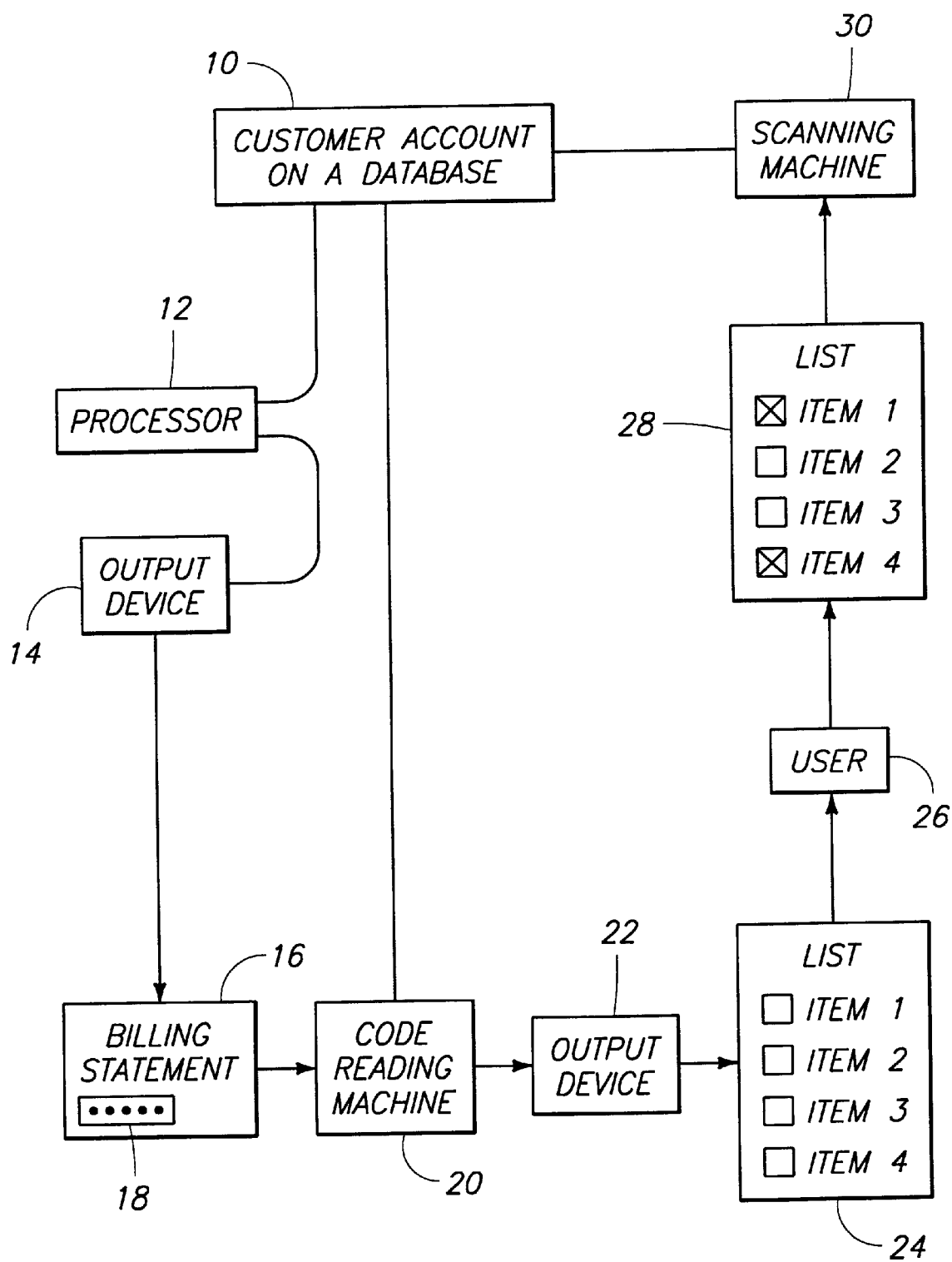

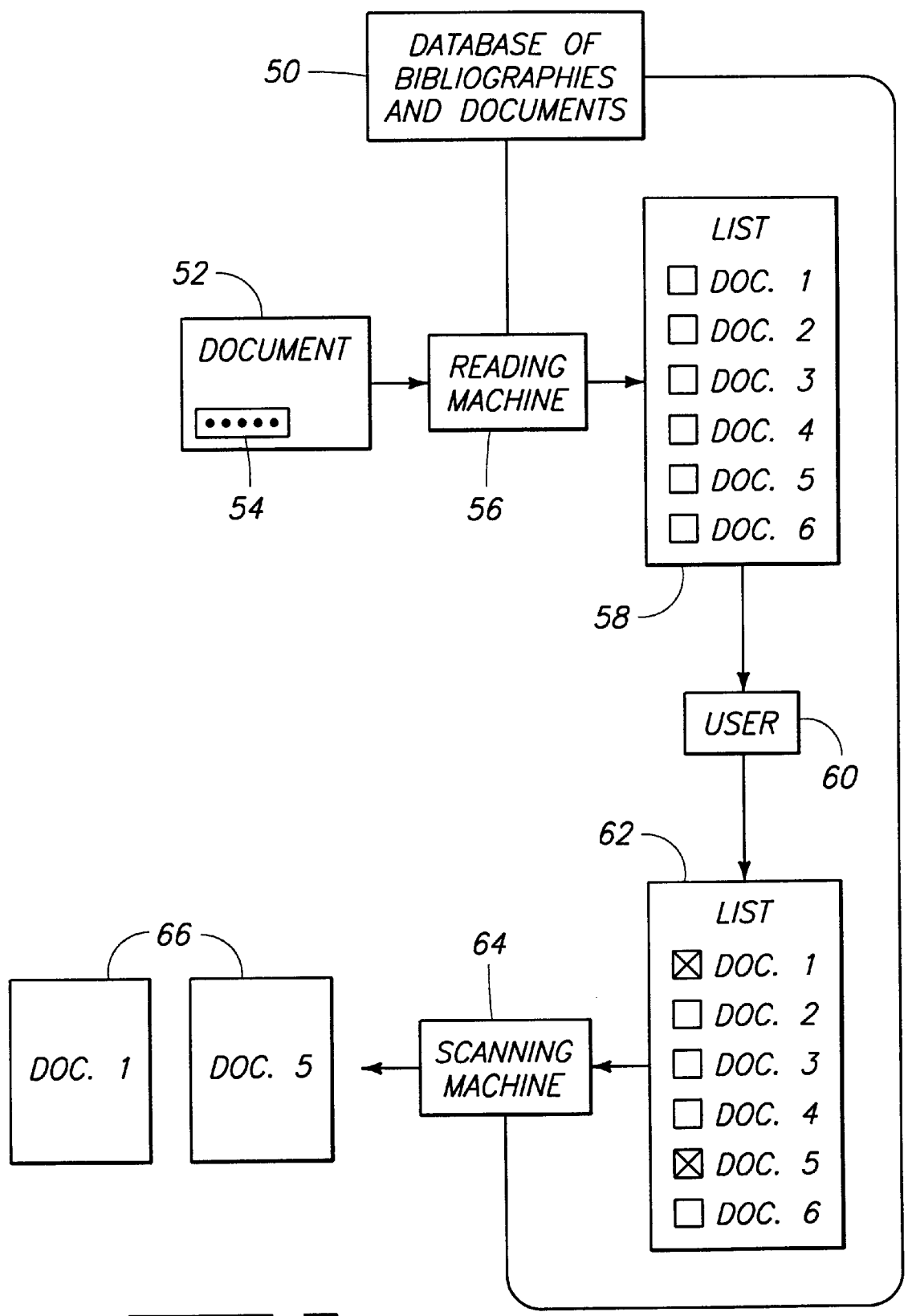

METHODS OF OBTAINING LISTINGS OF INFORMATION FROM DATABASES

FIELD OF THE INVENTION

The invention encompasses methods of obtaining listings of information from databases and utilizing the listings as user input to a machine in data communication with the databases. In particular aspects, the invention encompasses methods of enabling customers to review information from an account that is stored in a database. In other aspects, the invention encompasses methods of identifying materials that cite a document.

BACKGROUND OF THE INVENTION

Presently, a large amount of information is stored on databases. Many of the databases are linked to networks. A particularly popular network is the so-called "Internet," which is a network extending across numerous countries, and across both hemispheres of the globe. The world wide web (the web) is a portion of the global Internet having hypertext-enabled pieces of information. Specific locations on the Internet are identified by a uniform resource location (URL) which is effectively an address of the information on the Internet.

It would be desirable to develop new methodologies for enabling persons to access and utilize information available in networks. It would be particularly useful to develop new methodologies which could be utilized for enabling persons to retrieve information accessible through the Internet.

SUMMARY OF THE INVENTION

In one aspect, the invention encompasses a method of obtaining a listing of information from a database and utilizing the listing as a user input to a machine in data communication with the database. A database is provided, and such database has a plurality of objects stored therein. A machine is utilized to form a machine-readable code on a substrate. The machine-readable code describes the location of a set of objects in the database. The machine-readable code is read with a reading machine configured to access the database and extract the set of objects from the database. The extracted set of objects is outputted as a listing on a substrate. The substrate having the listing thereon is provided to a user. The user marks at least some of the objects on the listing. After at least some of the objects are marked, the listing is scanned with a scanning machine configured to recognize the objects and to distinguish marked objects from unmarked objects. The scanning machine is in data communication with the database and is in data communication with a processor which performs a different operation on marked objects of the listing than on unmarked objects of the listing. Accordingly, the listing on the substrate functions as a user input to the processor.

In another aspect, the invention encompasses a method of enabling customers to review information from an account that is stored in a database. A printed communication having machine-readable code associated therewith is provided to a customer. The machine-readable code identifies the database location where the customer's account information is stored. The machine-readable code is read with a machine configured to extract the database location from the machine-readable code and to access the database location. Account information is sent from the database location to an output device accessible by the customer to enable the customer to review information from the account.

In yet another aspect, the invention encompasses a method of identifying materials that cite a document. A database of bibliographies of numerous materials is provided. A document having machine-readable code associated therewith is provided. The machine-readable code identifies the document within the database of bibliographies. The machine-readable code is read with a machine configured to extract an identification of the document from the machine-readable code. The machine is in data communication with the database and is configured to search the database for bibliographies referencing the document. The machine is further configured to correlate any bibliography referencing the document to a particular material containing the bibliography. The machine is in data communication with an output device. A list of materials which referenced the document is outputted by the output device, and, as above, the user can select from this listing other documents they would like to retrieve.

DESCRIPTION OF THE DRAWINGS

FIG. 1 is a flow chart describing a process encompassed by the present invention.

FIG. 2 is a block-diagram view of one embodiment of the invention.

FIG. 3 is a block-diagram view of another embodiment of the invention.

DETAILED DESCRIPTION OF THE INVENTION

As discussed above in the "Background" section of this disclosure, a large amount of information is presently available in networks. Among the networks which can be utilized to store information is the Internet, which is accessible to persons throughout the world. An interesting aspect of networks, such as the Internet, is that such networks can be accessed by virtually anyone having access to a data transfer line. A data transfer line can comprise, for example, a telephone line. The networks can be accordingly be utilized for exchange of information across a town, across a country, and even across the globe.

A difficulty in utilizing the networks for exchange of information can be in finding access to a suitable input device for reaching the network. Specifically, the network is typically accessed through a computer keyboard, but such can be awkward and relatively time consuming in particular applications.

In one aspect of the invention it is recognized that there are numerous applications wherein persons are familiar with marking items in a list to indicate that certain items of the list are to be treated differently than other items in the list. It is further recognized that in many applications it can be quicker and more convenient for a person to simply mark items of a list with a pencil, pen, or other marking device, than to use a keyboard as an input device. Accordingly, the invention encompasses a recognition of the desirability of utilizing a marked substrate region as an input device, and further encompasses methodologies for incorporating a marked substrate region input for obtaining data from a network.

A general process encompassed by the present invention is described with reference to a flow chart of FIG. 1. In step (100), a database is provided. Such database is preferably linked to a network, and more preferably linked to the Internet. The database has a plurality of objects stored therein, at least some of which are ultimately to be accessed by a user.

Referring to step (110), machine-readable code is formed on a substrate. The machine-readable code describes a location of the set of objects in the database. The machine-readable code can be formed by a number of methods including, for example, printing a bar-code on a substrate, printing a camouflaged code on a substrate (the camouflaged code can be in the form of half-tone markings within an image prepared on the substrate, or in the form of an ink which is not visible when viewed with only visible wavelength light), or by having a person write a code on the substrate. In applications wherein the person writes the code on the substrate, the code is machine-readable when read with a machine coupled with handwriting-recognition software. The code on the substrate can comprise, for example, a reference to a location of objects on a network, such as a serial number, access code, or a URL address corresponding to an Internet location at which the objects are stored. In particular applications, the code can be formed on a substrate with a machine configured to support voice input and to mark or annotate the substrate for further action/workflow.

Referring to step (120), the machine-readable code is read with a machine configured to extract the set of objects from the database. Such machine can comprise, for example, a scanning machine having a processor that is connected through a phone line to the Internet. The machine extracts the objects from the database and outputs the set of objects as a listing on a substrate (step (130)). The outputting of the set of objects as a listing on the substrate can be accomplished by, for example, having the machine that extracted the set of objects send the objects to an image-forming device, such as a printer or fax machine. The image forming device can, for example, be a printer which prints the set of objects as a listing on a piece of paper.

Referring to step (140), the listing is provided to a user who marks at least some of the listed objects. The user can mark the objects by, for example, utilizing a pencil, pen or other marking device to form a visible mark on at least some of the listed objects. Although the invention is described with reference to markings on a listing, it is to be understood that the invention can pertain generally to applications wherein markings (or annotations) are formed on regions of a substrate.

Referring to step (150), the marked listing is scanned with a machine configured to distinguish marked objects from unmarked objects. Such machine can, for example, utilize document identity to recover an unmarked (unannotated) original of the listed objects on the substrate and utilize a processor to map annotations provided on the marked listing with particular actions. The processor can perform a different operation on marked objects of the listing than on unmarked objects of the listing. The listing of step (130) thus functions as user input to a processing device. Also, the markings in different locations of the substrate can indicate that different types of actions are to occur. For instance, the substrate can comprise one region in which markings indicate user authorization to retrieve materials from the database, and another region in which markings indicate items that are to be retrieved from the database.

Specific embodiments of the invention are described with reference to FIGS. 2 and 3. Referring to FIG. 2, a method of the present invention can be utilized for enabling customers to review information from an account stored on a database. Specifically, the methodology described in FIG. 2 comprises a database 10 having a customer account stored thereon. Database 10 is in data communication with a processor 12 configured to extract customer account information from database 10 and send the information to an output device 14. Output device 14 then prints a statement 16 summarizing activity on the customer account. Statement 16 can comprise, for example, a billing statement. Output device 14 also forms a machine-readable code 18 on statement 16. Such machine-readable code indicates a location on database 10 wherein the customer account is stored. Such location can be identified by, for example, a URL address. In a sense, the machine-readable code identifies a particular document amongst a class of documents, and can, as described below, be utilized to retrieve a machine representation of the particular document.

Billing statement 16 is sent to a customer having access to a code-reading machine 20 which is in data communication with database 10. Code-reading machine 20 is configured to read code 18 and ascertain the location of the customer account on database 10. Code-reading machine 20 can be further configured to require an access code to be input from a user prior to accessing information in a customer account. Such access code can enhance security of transactions. The access code can be provided to machine 20 by, for example, voice or tactile input processes.

Code-reading machine 20 utilizes the address information extracted from code 18 to locate and extract customer account information from database 10. Such customer account information is then sent to an output device 22 in data communication with code-reading machine 20. Output device 22 can comprise, for example, a printer, fax machine or computer terminal that allows the customer to view the record and authenticate the payment. If the output device is a computer terminal, the account information can be sent to the customer in the form of a dialogue box. The customer can then review information from his/her account in the dialogue box and submit information (such as, for example, authentication) through tactile or other input to the computer terminal.

In particular applications, output device 22 prints information from the customer account on a substrate. In the shown exemplary embodiment, such information is printed as a list 24. The list is accessible to the customer and enables the customer to review information from the account. In the shown embodiment, list 24 comprises a number of check boxes associated with items from the account. The list 24 is operated on by a user 26 (e.g., the customer) who marks one or more items on the list (i.e., annotates the information printed on the substrate) and thus forms a marked list 28 (which can also be referred to as annotated information on the substrate). Marked list 28 is provided to a scanning machine 30 configured to process the list and distinguish marked objects from non-marked objects.

In one aspect, the items printed on the list correspond to activities occurring within the customer's account, and specifically correspond to charges assigned to the account. The customer can then mark the list of charges to identify those charges which the customer authorizes relative to those charges which the customer does not authorize. For instance, the customer could specifically mark only the authorized charges, while leaving the unauthorized charges unmarked. Scanning machine 30 is in data communication with a processor which causes marked items to be processed differently than unmarked items. For instance, in the embodiment described above wherein the marked items correspond to authorized charges and the unmarked items correspond to unauthorized charges, the processor can be configured to allow funds to be withdrawn from a separate customer account to pay for the authorized charges, while flagging the unauthorized charges for dispute resolution. As another example, a customer could provide annotations on the items of the list to indicate that the customer desires more information (i.e., "What is the charge for $523 from Texas?") Scanning machine 30 is in data communication with database 10, and accordingly can enable immediate processing of information in the customer account on database 10.

Although the above-described embodiment indicates that a code 18 is provided directly on a billing statement 16, the invention encompasses other embodiments wherein the code is provided on materials associated with the billing statement, either alternatively, or in addition to being provided on the billing statement. For instance, in particular applications the billing statement is provided within an envelope which is sent to a customer's address. The code 18 can be provided on an external surface of the envelope so that a person can access the information in the customer account by simply scanning the envelope into code-reading machine 20. In such embodiments, the envelope can be provided to the customer without a separate billing statement enclosed therein. The customer can then access the billing statement by scanning the envelope into a code-reading machine. In particular embodiments, the envelope can simply be a postcard having the machine-readable code printed thereon. Such utilization of only a postcard, rather than an envelope and enclosed bill, can save printing costs, postage costs, envelope stuffing costs, and envelope opening costs.

Referring to FIG. 3, the invention also encompasses an embodiment wherein materials citing a particular document are extracted from a database. The methodology of FIG. 3 comprises providing a database 50 having bibliographies and documents electronically stored thereon. The methodology of FIG. 3 also comprises providing a hard copy of a document 52, with such hard copy having machine-readable code 54 provided thereon. Document 52 can comprise, for example, text and/or graphics printed on paper. Machine-readable code 54 can be provided at the time of production of document 52, and identifies document 52 within database 50. Document 52 can be formed by printing text on a substrate (such as, for example, paper), and machine-readable code 54 can be printed on the substrate at the same time the text is printed.

Document 52 is provided to a reading machine 56 which reads machine-readable code 54. Reading machine 56 is in data communication with database 50 and extracts a list of documents stored on database 50 which cite document 52. The list extracted by reading machine 56 is printed on a substrate to form a hard copy 58 of the list. Hard copy 58 can be formed by, for example, outputting the list to a printer or fax machine.

List 58 is a listing of the documents stored on database 50 that cite document 52. In the shown embodiment, the documents are provided with check boxes adjacent thereto. In other embodiments, the documents can be provided as simply a listing without check boxes. In any event, list 58 is passed to a user 60 who provides markings associated with at least some of the documents of list 58. In the shown embodiment, such markings are checks within the check boxes. In embodiments in which check boxes are not provided, such markings can comprise, for example, circles around documents of interest, or lines through documents of interest. The markings can be provided by, for example, a pencil, pen or other writing implement. The user's marking of the list 58 converts list 58 to a marked list 62. Marked list 62 is provided to a scanning machine 64 which is in data communication with database 50. Scanning machine 64 is in data communication with a processor (not shown) configured to identify the marked documents of list 62 and locate such marked documents within database 50. The processor can be comprised by scanning machine 64.

Scanning machine 64 is in data communication a printing device. The marked documents located within database 50 are extracted from the database by the processor, and subsequently sent to a printing device to form hard copies 66 of the marked documents. Hard copies 66 can further comprise codes (not shown) provided on the hard copies to identify the hard copies to reading machine 56, such that the above-described process can be repeated to find documents within database 50 that cite documents 66.

Although in the above-described embodiment it is the marked documents which are located within database 50, it is to be understood that the invention encompasses other embodiments wherein it is the unmarked documents that are located within database 50. In any event, the marked documents of list 62 are treated differently than are the unmarked documents of list 62 by scanning machine 64 and a processor associated therewith.

What is claimed is:

1. A method of obtaining a listing of information from a database and utilizing the listing as a user input to a machine in data communication with the database, comprising:

providing a database having a plurality of objects stored therein as a set;

utilizing a machine to form a machine-readable code on a first article, the machine-readable code describing a location of the set of objects in the database;

reading the machine-readable code with a reading machine configured to access the database and extract the set of objects from the database;

outputting the extracted set of objects as a listing on a second article different from the first article;

providing the second article having the listing thereon to a user, the user marking at least some of the objects on the article; and after at least some of the objects are marked, scanning the listing with a scanning machine configured to recognize the objects and to distinguish marked objects from unmarked objects, the scanning machine being in data communication with the database and being in data communication with a processor which performs a different operation on marked objects of the listing than on unmarked objects of the listing, the listing thus functioning as a user input to the processor.

2. The method of claim 1 wherein:

the first article marked with the machine-readable code is sent from a provider to a customer;

the database comprises the customer's account with the provider and is accessible to the customer through a network;

the location identified by the machine-readable code is a reference to a location on the network comprising information pertaining to the customer's account;

the set of objects extracted from the database comprises the customer's charges to the provider;

the first article comprises a sheet of paper;

the reading machine comprises a program configured to access the customer's account through the address provide d in the machine-readable code and output a listing of the customer's charges on the sheet of paper in a form whereby the customer can mark authorized charges differently than unauthorized charges;

the customer marks the authorized charges on the list differently than the unauthorized charges on the list; and the list is scanned to identify authorized charges and unauthorized charges in the customer's charges, the processor altering one or both of the objects corresponding to authorized charges and the objects corresponding to unauthorized charges in response to input from the marked list, the objects corresponding to authorized charges being processed differently by the processor than are the objects corresponding to unauthorized charges.

3. The method of claim 2 wherein the marking the authorized charges differently than the unauthorized charges comprises marking either the authorized charges or unauthorized charges, and not marking the other of the authorized charges and unauthorized charges.

4. The method of claim 2 wherein the network encompasses countries in different global hemispheres.

5. The method of claim 2 wherein the sending of the article marked with the machine-readable code comprises mailing a bill printed on a sheet of paper from the provider to the customer, the machine-readable code being formed by printing the code on the bill.

6. The method of claim 2 wherein the sending of the article marked with the machine-readable code comprises:
   placing a bill printed on a sheet of paper in an envelope, and
   mailing the envelope having the bill therein from the provider to the customer, the machine-readable code being formed by printing the code on one or both of the bill and the envelope.

7. The method of claim 1 wherein:
   the first article marked with the machine-readable code is a first publication which is cited by one or more citing publications;
   the database comprises a listing of publications and is accessible to a user through a network;
   the location identified by the machine-readable code is an address on the network that contains the first publication and the citing publications;
   the set of objects extracted from the database comprises the citing publications;
   the second article comprises a sheet of paper having one or more bibliographies of the citing publications printed thereon, the bibliographies being lists of references;
   the first machine comprises a program configured to access the location identified by the machine-readable code and output a listing of the citing publications and the bibliographies of the citing publications;
   the user marks references in the listing to indicate references which are to be retrieved from the database; and
   the marked listing is scanned, the processor locating objects in the database corresponding to references marked by the user and retrieving such objects from the database.

8. The method of claim 7 wherein the network extends between at least two countries in different global hemispheres.

9. The method of claim 7 wherein the publication is printed on a sheet of paper, and wherein the forming the machine-readable code comprises printing the machine-readable code on the sheet of paper as the publication is printed.

10. A method of enabling customers to review information from an account that is stored in a database, comprising:
   providing a printed communication having machine-readable code associated therewith to a customer, the machine-readable code identifying a database location wherein the customer's account information is stored;
   reading the machine-readable code with a machine configured to extract the database location from the machine-readable code and to access the database location;
   sending account information from the database location to an output device accessible by the customer to enable the customer to review information from the account, the account information comprising a listing of transactions and being output as a fist of the transactions on a sheet of paper;
   the customer marking at least some of the listed transactions, the customer's markings being different on the listed transactions which are authorized than on the listed transactions which are not authorized; and
   scanning the marked transaction list with a machine configured to process the customer's markings to identify authorized charges and unauthorized charges in the customer's account, the machine comprising a processor in data communication with the database, the processor causing transactions in the account for which the customer authorizes charges to be processed differently than are transactions in the account for which the customer does not authorize charges.

11. The method of claim 10 wherein the printed communication is sent to the customer via the mail.

12. The method of claim 10 wherein the printed communication is a statement of account activity sent to the customer in an envelope, and wherein the machine-readable code is printed on either the statement or the envelope.

13. The method of claim 10 wherein the processor is configured to transfer money owned by the customer to pay the charges which the customer authorizes to be processed and to not transfer money owned by the customer to pay the charges which the customer does not authorize to be processed.

14. The method of claim 10 wherein the marking the authorized transactions differently than the unauthorized transactions comprises marking either the authorized transactions or unauthorized transactions, and not marking the other of the authorized transactions and unauthorized transactions.

15. The method of claim 10 wherein the database is part of a network that extends between at least two countries in different global hemispheres.

16. A method of identifying materials that cite a document, comprising:
   providing a database of bibliographies of numerous materials;
   providing a document having machine-readable code associated therewith, the machine-readable code identifying the document within the database of bibliographies;
   reading the machine-readable code with a machine configured to extract the document identification from the machine-readable code, the machine being in data communication with the database and being configured to search the database for bibliographies referencing the document, the machine being further configured to correlate any bibliography referencing the document to a particular material containing the bibliography, the machine being in data communication with an output device;
   outputting a list of the materials which referenced the document, wherein outputting the list of materials comprises printing the bibliographies of the materials, and wherein the bibliographies list materials in the database;

providing the outputted bibliographies to a user who marks listed materials in the bibliographies which are to be retrieved from the database; and scanning the marked bibliographies with a scanner that is in data communication with a processor, the processor being in data communication with the database and being configured to locate and retrieve listed materials marked by the user on the bibliographies.

17. The method of claim 16 wherein the document comprises a sheet of paper having text printed thereon, and wherein the machine-readable code is provided on the document by printing the machine-readable code on the sheet of paper as the text is printed.

18. The method of claim 16 wherein the database is part of a network that extends between at least two countries in different global hemispheres.

19. A method comprising:

providing a database configured to store a plurality of account records respectively including a plurality of charges;

printing a machine-readable code on a sheet, the machine-readable code describing a location of a particular account record in the database;

scanning the machine-readable code;

accessing the database and accessing the particular account record in response to the scanning;

printing the plurality of charges of the particular account record on a second sheet for use by a user who selectively marks the second sheet to indicate any disputed charges;

scanning the second sheet; and distinguishing authorized charges from unauthorized charges, by machine, responsive to markings on the second sheet.

* * * * *